United States Patent [19]

Koelewijn

[11] Patent Number: 4,681,485
[45] Date of Patent: Jul. 21, 1987

[54] END MILL CUTTING TOOL AND INDEXABLE INSERT THEREFOR

[75] Inventor: Rob Koelewijn, Milford, Conn.

[73] Assignee: GTE Valeron Corporation, Oak Park, Mich.

[21] Appl. No.: 833,372

[22] Filed: Feb. 25, 1986

[51] Int. Cl.⁴ .............................. B23C 5/02; B23C 5/20
[52] U.S. Cl. .................................... 407/42; 407/53; 407/59; 407/113
[58] Field of Search ............... 407/15, 34, 36, 42, 407/53, 54, 59, 113, 114; 408/186, 199, 713

[56] References Cited

U.S. PATENT DOCUMENTS

| Re. 26,544 | 3/1969 | Castor . | |
|---|---|---|---|
| 1,577,952 | 3/1926 | Carnegie . | |
| 2,289,344 | 7/1942 | Cedarleaf . | |
| 2,645,003 | 7/1953 | Thompson et al. . | |
| 3,103,736 | 9/1963 | Ortman, Jr. . | |
| 3,504,413 | 4/1970 | Siewert et al. . | |
| 3,551,978 | 1/1975 | Berry . | |
| 3,670,380 | 6/1972 | Moore et al. . | |
| 4,093,392 | 6/1978 | Hopkins | 407/48 |
| 4,132,493 | 1/1979 | Hosoi | 407/54 |
| 4,175,896 | 11/1979 | Kishinami et al. | 407/42 |
| 4,182,587 | 1/1980 | Striegl | 407/113 |
| 4,212,568 | 7/1980 | Minicozzi | 407/53 |
| 4,251,172 | 2/1981 | Durand | 407/54 |
| 4,252,480 | 2/1981 | Mizuno et al. | 407/54 |
| 4,253,506 | 3/1981 | Shimohira | 144/221 |
| 4,531,864 | 7/1985 | Bylund | 407/114 |
| 4,552,491 | 11/1985 | Parker | 407/113 |
| 4,566,827 | 1/1986 | Neumueller | 407/113 |
| 4,588,331 | 5/1986 | Yoshinori | 407/113 |

FOREIGN PATENT DOCUMENTS

| 713504 | 11/1941 | Fed. Rep. of Germany . | |
| 2916809 | 11/1979 | Fed. Rep. of Germany | 407/15 |
| 805981 | 9/1936 | France . | |
| 607770 | 9/1948 | United Kingdom . | |

Primary Examiner—Nicholas P. Godici
Assistant Examiner—Jerry Kearns
Attorney, Agent, or Firm—Kramer, Brufsky & Cifelli

[57] ABSTRACT

An end milling tool having a positive axial rake angle in side elevation to facilitate removal of chips from the surface of a workpiece and a curved cutting edge having a neutral (zero) to positive rake angle in bottom plan view as it progressively cuts to enhance chip removal while precluding welding at the work area and enabling the use of a low cutting force. The tool cutting area is formed by a rhomboid-shaped indexable cutting insert at one end having an angular axial rake with a unique curved surface in side elevation provided with a lead corner and a strong included angle in an end elevational view. Other inserts are mounted on the tool above the rhomboid insert to form the remainder of the cutting area and are circular in side elevational view. Each of the rhomboid and circular inserts are mounted in an insert seat having a 60° conical configuration to obtain maximum rigidity in seating of the insert. The inserts are mounted in adjacent helical rows adjacent to and each having a curved cutting edge portion extending into a helical flute or slot.

9 Claims, 15 Drawing Figures

END MILL CUTTING TOOL AND INDEXABLE INSERT THEREFOR

BACKGROUND OF THE INVENTION

1. Field of the Invention

This invention relates a rotary cutting tool, and more particularly, to an end mill provided with a plurality of novel, indexable cutting inserts.

2. Description of the Prior Art

An end mill is a a cutting tool which includes a cylindrical body configuration having a shank portion and a cutting portion. The cutting portion contains a plurality of helically disposed teeth or on-edge cutting inserts extending from the shank end to the opposite, free end of the tool, which, when rotated and brought into contact with a workpiece, can remove metal from the workpiece.

The problems inherent in the use of such a conventional end milling cutter manifest themselves in excessive wear and relatively poor cutting action, or both, of the cutting tool, owing to the fact that the entire length of a cutting edge may be applied to the workpiece at the same time. Further, chips are continuously produced at the work area which, if not satisfactorily removed from the work area, require excess power to be applied to the tool to effect cutting, while also resulting in increased wear of the cutting edges. There have been many attempts made to improve the cutting action and decrease the wear in such tools.

For example, when an end mill is provided with a neutral (zero) axial rake angle for its cutting edges, it can move through metal, leaving a reasonably straight wall. By axial rake angle of the cutting edge is meant the angle subtended by extending the cutting edge until it meets the logitudinal axis of the tool. If the angle is less than 90°, it is considered to be a positive axial rake angle, while if this angle is 0° or the edge is parallel to the axis, the axial rake is neutral. There are certain disadvantages to conventional, neutral (zero) axial rake cutters. The chips cut from the workpiece do not discharge readily and are apt to dull the tool as they are pulled back into the groove or slot being cut. Thus, in most cases, it is desirable to have a cutting action which is obtainable with a positive axial rake angle. The positive axial rake cutting tends to move the chips up and away from the cutting area, and the very nature of the positive rake cut makes for a smoother cutting action and prolonged tool-life. In addition to the enhancement of chip removal, by use of an axial rake angle in an end mill cutter, excessive wear and its corollary of relatively poor cutting action can be reduced extensively due to preclusion of the entire length of the cutting edge not being applied to the workpiece at the same time, but rather, in a progressive cutting or shearing step.

Further, when the active cutting edge is disposed not only at a postive axial rake angle, but also a positive radial (i.e., double positive) rake angle, the cutting edge is maintained relatively sharp and less power is required to cut the workpiece, as compared to the case when the edge is at a negative radial rake and is thus relatively blunt as it strikes the metal. By a positive radial rake angle is meant the angle subtended by an extension of the cutting face at the cutting edge, and a radial line passing through the cutting edge in a plane perpendicular to the longitudinal axis of the tool, which is less than 180°. Thus, an on-edge insert for a cutting tool having cutting edges adapted to cut at double positive rake angles is advantageous in that the active cutting edge can cut the work with relatively low power and yet can withstand comparatively high forces before failing. Further, chip removal is greatly enhanced, thereby minimizing chatter and vibration of the tool as it removes metal from the workpiece.

While providing a mill end cutter with on-edge inserts having both a positive axial and radial rake angle will enhance the cutting of a metal workpiece, I have found that the cutting action can be improved further by providing cutting inserts which are indexable to present rounded cutting edges to the workpiece. Particularly, the lower-most cutting insert for initial contact with the workpiece is preferably in the shape of a rhomboid and is provided with opposed, unique curved cutting edges, each having its radial center below the center of the insert itself which, as it cuts, will cause a chip cut from the workpiece to be pulled up and away from the workpiece during the cutting motion, as well as away from the workpiece because of its axial rake. The curved cutting edge of the rhomboid insert can be defined as an arc presenting a zero or neutral to positive radial rake angle throughout most of its cutting edge in contact with the metal workpiece as it cuts through the workpiece. The rounded edge significantly increases the wear and life of the tool before the insert has to be indexed because of its progressive (shearing) cutting action as compared to a straight cutting edge in contact throughout with the workpiece and, as indicated, the curved edge serves to push the chips away from the workpiece into an appropriate helical "flute" or slot adjacent the cutting edge much more readily, where it can be carried away from the workpiece. Further, the tool runs much quieter because of the shearing action provided by the "rounded" edge as it progressively enters the workpiece as compared with a "straight" cutting edge insert which provides for simultaneous cutting action all along the workpiece and cutting edge. Finally, the insert has a lead at the end of the curve or arc, which, because of its radius, results in a high strength corner. The tool design thus results in a very strong tool which highly resists chipping, thermal cracking, or chip adhesion.

The inserts can be mounted on a 20° helix which results in excellent chip expulsion into an adjacent flute.

The rhomboid insert can be used in combination with a plurality of round or circular indexable inserts, which are very economical since they can be indexed to present a plurality of cutting edges as the insert wears, in combination with the longer-life rhomboid inserts which are used to effect initial cutting and entry of the workpiece at the bottom end of the tool. As with the rhomboid insert, the round inserts can be provided with a neutral or zero radial rake at the highest cutting point, but a positive radial rake below this point, so as to stimulate the action of the rhomboid insert in effecting positive radial rake cutting while the rounded or arcuate cutting edge also aid in expelling chips up an adjacent flute. As indicated, the radial rake changes drastically around the periphery of the cutting area of each round insert, but, as in the rhomboid insert, the curved cutting edge, which progresses from a zero or neutral to a positive radial rake during cutting of the workpiece, provides a shearing effect as it cuts to effect quiet operation requiring less power. Further, since the round or circular inserts have a relatively small cutting area, they produce smaller chips which contributes to its quiet performance.

Because of the curved cutting edges on both the circular and rhomboid inserts, actual cutting pressure causes a compression of these surfaces within the cutting area which is in effect larger than if the edge was straight, which reduces tool wear significantly.

The circular or round inserts can optionally be mounted on the cutting area adjacent a flute at a positive axial rake angle, if desired, to obtain the benefits of axial rake cutting. The rhomboid and circular inserts include a strong included angular base which can be mounted in a 60° V-shaped or conical pocket which results in an extremely strong mount for each insert around the circumference or periphery of the tool. The end mill can also be made with multiple, effective flutes or slots into which the chips can be driven and removed from, with the rows of cutting elements or inserts extending into adjacent flute areas being staggered in vertical extent up the the cutting area of the tool so that the tool can effect cutting faster and cover all the areas of the workpiece, efficiently.

SUMMARY OF THE INVENTION

Accordingly, in its broadest aspect, this invention relates to an end milling tool having a positive axial rake angle in side elevation to facilitate removal of chips from the surface of a workpiece and a curved cutting edge having a neutral (zero) to positive rake angle in bottom plan view as it progressively cuts to enhance chip removal while precluding welding at the work area, thus enabling the use of a low cutting force. The tool cutting area is formed by a rhomboid-shaped indexable cutting insert at one end having an angular axial rake with a unique curved surface in side elevation provided with a lead corner and a strong included angle in an end elevational view. Other inserts are mounted on the tool above the rhomboid insert to form the remainder of the cutting area and are circular in side elevational view. Each of the rhomboid and circular inserts are mounted in an insert seat having a 60° conical configuration to obtain maximum rigidity in seating of the insert. The inserts are mounted in adjacent helical rows adjacent to and each having a curved cutting edge portion extending into a helical flute or slot.

BRIEF DESCRIPTION OF THE DRAWINGS

Further objects and advantages of the invention will become more apparent from the following description and claims, and from the accompanying drawings, wherein:

FIG. 12b is a side view in elevation of the insert mounted in FIG. 12a;

DETAILED DESCRIPTION OF THE PREFERRED EMBODIMENT

Figure 1:
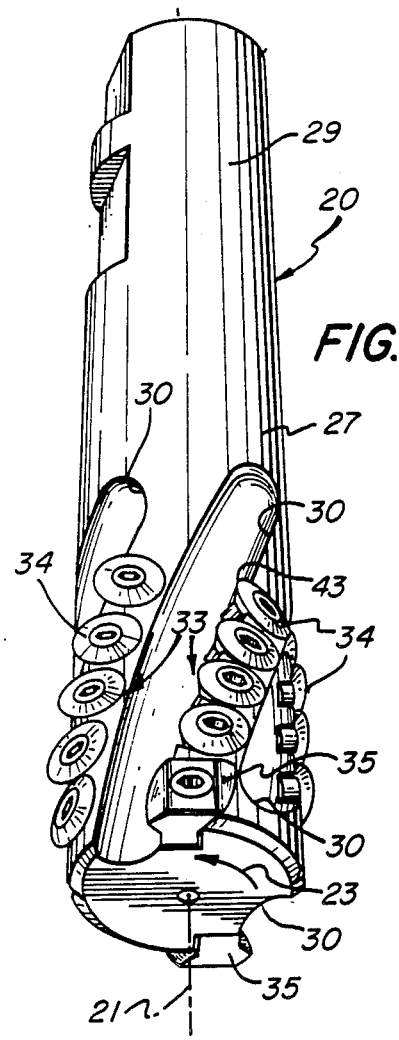
FIG. 1 is a perspective view of the end mill cutter of the present invention.

Referring now to the drawings in detail, wherein like numerals indicate like elements throughout the several views, and while some of the principles of the invention are applicable to various types of cutting tools, reference herein is made to an end mill cutter generally designated by the numeral 20.

The end mill cutter 20 is rotatable about a central axis 21 in the direction of the arrow 23 (see FIGS. 1 and 3) and is adapted to be moved endwise or axially toward a workpiece (not shown) in the direction of the arrow 25 (see FIG. 2) and then fed radially in the direction of the arrow 26 while rotating so as to remove metal from the workpiece. Specifically, the cutter 20 includes a cylindrical metal body 27 having a mounting shank 29 at its upper end and formed with four angularly spaced slots 30. Alternating ones of slots 30 open in the bottom end plane of the body 27 while the remaining slots have ends which are spaced upwardly from the end of the body 27. Each slot 30 opens in the peripheral surface of the body 27. The cutter which has been illustrated is commonly referred to as a helical end mill in that each slot 30 extends helically along and around the axis 21 of the cutter 20.

Figure 6:
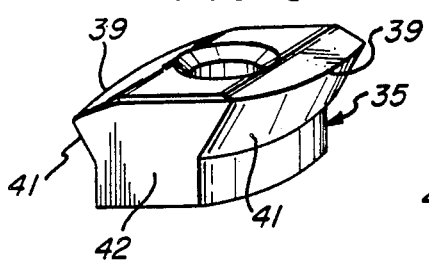
FIG. 6 is a perspective view of one of the indexable inserts used in the cutter of FIG. 1.
Figure 7:
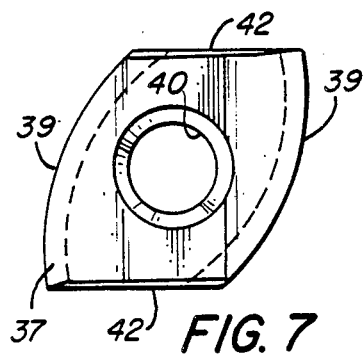
FIG. 7 is a top plan view of the insert of FIG. 6.
Figure 8:
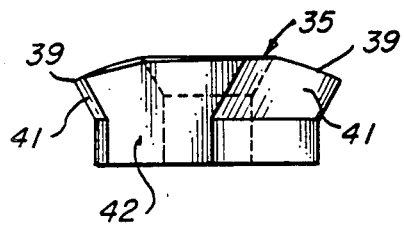
FIG. 8 is a front view in elevation of the insert of FIG. 7.

Disposed in the rear or inner end portion (in the direction of rotation) of each slot 30 is a row 33 of indexable cutting inserts. Each of the inserts in a row 33 is formed from a block of suitable cutting material such as tungsten carbide. Two types of inserts are utilized in the end milling cutter 20 of the present invention. Adjacent a helical slot 30 which opens in the end plane of body 27, the uppermost inserts include a series of four round or circular cutters 34 illustrated in detail in FIGS. 9 to 11, inclusive. These inserts 34 are seated above a unique rhomboid-shaped insert 35, shown in detail in FIGS. 6 to 8 inclusive, which have a corner 37 extending downwardly below the bottom surface or end plane of the cutter body 27. The corner 37 extends downwardly beyond the end of the plane of the cutter body 27 at an angle α of approximately 3° as illustrated most clearly in FIG. 2 to provide a lead cutting edge for entering the metal material of the workpiece.

The opposed edges of the rhomboid-shaped insert 35 are arcuate or curved as indicated at 39 for a purpose which will be described in more detail hereinafter. Two rhomboid inserts 35 are provided on opposed edges of the periphery of cutter body 27. The alternating rows 33 or series of inserts do not extend to the lower edge of the cutter body 27 but consist solely of five round or circular cutting inserts 34, whose lowermost member is above the bottom edge or end plane of the cutter body 27 contiguous to the end of each alternating helical slot 30, which is commonly referred to as a "flute".

Each insert 34,35 (see FIGS. 4 and 5, respectively) is supported in a pocket 38 defined in its respective slot 30 by a frusto-conical bore or seat having edges forming a 60° conical configuration, terminating in a lower cylindrical portion. Each insert 34,35 is held in place by a screw 36 inserted through the center of each insert and threaded into the cutter body 27.

Figure 2:
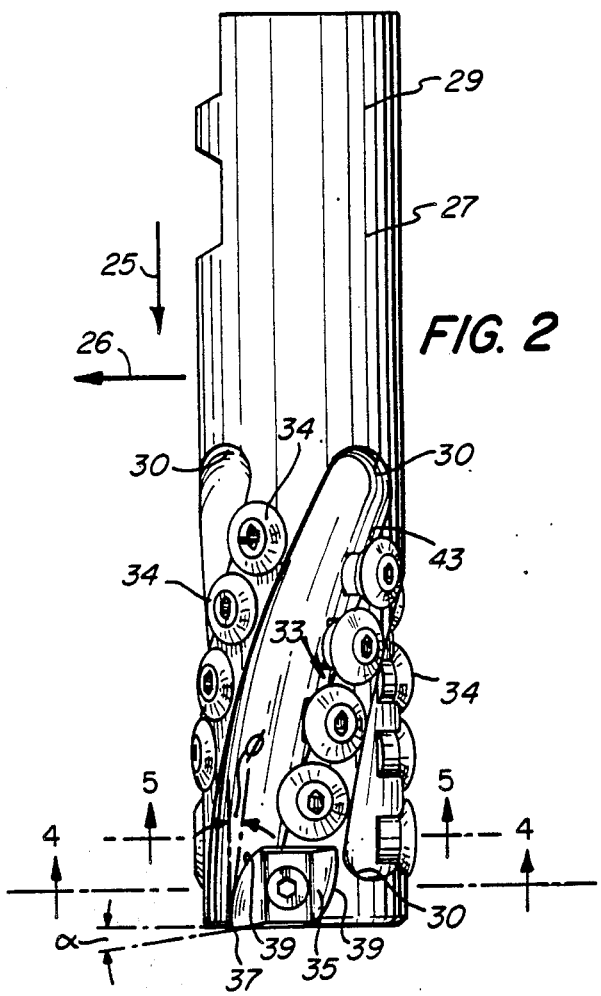
FIG. 2 is a side view in elevation of the end mill cutter of FIG. 1.
Figure 12A:
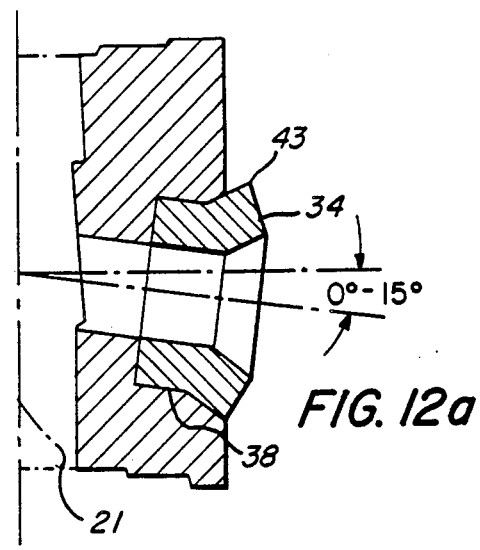
FIG. 12a is a cross-sectional view taken substantially along the plane indicated by line 12—12 of FIG. 5 and showing an alternative form for mounting one of the inserts provided on the cutter.
Figure 12B:
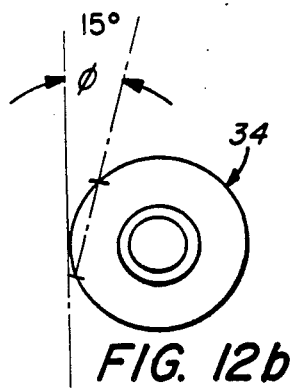
Figure 12C:
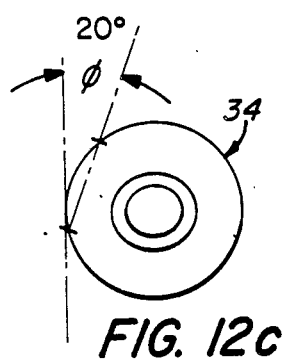
FIG. 12c is a view similar to FIG. 12b, but with the insert mounted at a different axial tilt or attitude on the cutter body.

When the insert 35 is located in its pocket 38, the cutting edge 39 which is disposed in active cutting position faces circumferentially about the circumference of cutter body 27 and is located at a positive axial rake angle $\phi$ as shown on FIG. 2. Each of the circular inserts 34 is disposed at a zero or neutral axial rake angle as it cuts, but optionally, it can have its axis tilted as illustrated in FIG. 12a from zero to 15° with respect to the longitudinal axis of the cutting body 12 so as to have an axial rake angle $\phi$, when the circular inserts 34 are viewed in side elevation as illustrated in FIGS. 12b and 12c. The tilt of the axis lowers the initial point of contact with the workpiece along the curved cutting edge so that a projection of the edge is no longer parrallel to the longitudinal axis of the cutter body 27. For example, as shown in FIG. 12b at a tilt of 5°, the axial rake angle of the cutter insert 34 will be at 15°. At a 7° tilt, the axial rake angle will be 20°. The cutting action thus developed by each tilted, circular insert will be very similar to the rhomboid cutting action as the chips will now be driven up each flute or slot 30.

Figure 4:
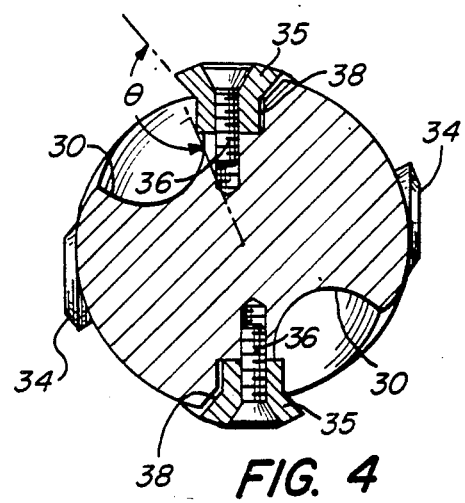
FIG. 4 is a cross-sectional view taken substantially along the plane indicated by line 4—4 of FIG. 2.
Figure 5:
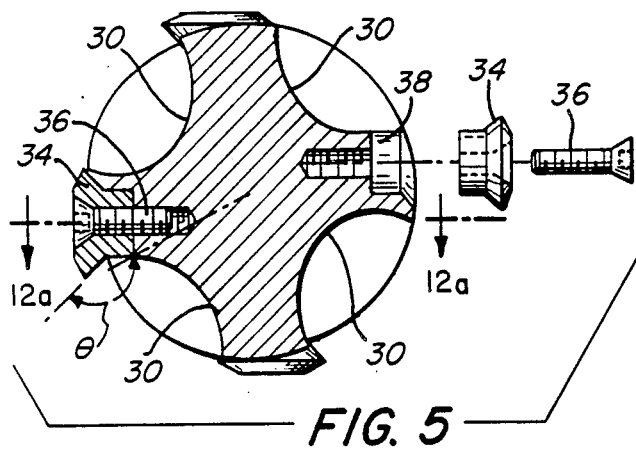
FIG. 5 is a cross-sectional view taken substantially along the plane indicated by line 5—5 of FIG. 2.

Moreover, the active cutting face of each insert 35 is initally located, as shown on FIG. 4, at a positive radial rake angle $\theta$. As cutting progresses along curved or arcuate cutting edge 39, the rake angle varies from a neutral (or zero) radial rake angle where the insert first makes cutting contact with the workpiece to a positive rake angle of approximately 165°. The radial rake $\theta$ of inserts 34 at the intial material engagement, as shown in FIG. 5, is substantially identical to that of inserts 35. As the engagement continues in the workpiece by the cutting edge 43 of insert 34, the radial rake angle changes from a zero radial rake to a positive radial rake at the cutting point. The effect is a shearing or progressive cutting action throughout the cutting area to obtain the benefits of a positive radial rake as discussed hereinbefore.

By appropriately indexing and/or inverting each of the inserts 34,35 by loosening its respective screw 36, a multitude of different cutting edges may be brought into active cutting position. In connection with each of the rhomboid inserts 35, there are two cutting edges 39, as the insert can be rotated 180°. There are approximately five cutting arcs on each of the circular inserts 34 which can be presented adjacent each longitudinal slot or flute 30, for cutting.

As shown in FIGS. 1 and 2, four inserts 34 are disposed in each of the slots 30 while a fifth insert 34 complements a rhomboid-shaped insert 35 in an adjacent slot 30 at the bottom end of each slot. The inserts in each slot are located in axially spaced, side-by-side relation and also are spaced circumferentially from one another. Because of the circumferential spacing, the inserts in each slot do not engage the workpiece simultaneously, but instead move into progressive engagement with the workpiece as the cutter 20 rotates.

Each of the inserts in adjacent slots are also staggered axially. Thus, the active cutting edge of the innermost insert 34 in each of the slots 30 axially spans the gap between one of the inserts in an adjacent slot. As a result of the staggered arrangement of the inserts in adjacent slots 30, the workpiece material which is left uncut between adjacent inserts of one slot 30 is wiped away or cut by the intervening insert in the following slot 30.

The insert 35 is particularly well suited for use as the outermost insert in each slot 30 of the end mill 20 and is also capable of advantageous use in other type cutters. The insert is illustrated in greater detail in FIG. 6 to 8, inclusive. The insert 35 is characterised by the fact that it is an on-edge, indexable insert having a plurality of cutting edges 39 each adapted to cut at a positive axial rake angle (see FIG. 2) and a positive radial rake angle (see FIG. 4). Cutting edges 39 are arcuate in shape and the radius of each cutting edge is below the center 40 of each insert. The radial rake proceeds from neutral (zero) to positive along edge 39 as it enters and cuts the workpiece. Because of the geometry of the rhomboid or parallelogram-shaped insert 35 and its positive radial rake during cutting, less power is required to turn the tool 20 and the rhomboid insert cuts with a progressive, shearing action; thus the tool runs much quieter with a minimum of chatter. Because of the positive axial rake and the curved cutting edges 39, there is substantially less wear on the cutting edge 39 than if it had straight edge contact with the material cut, and due to the curved cutting edge, chips are more readily expelled along each flute or slot 30 during the cutting action. Further, because the rhomboid insert 35 has a unique curve with the center of radii below the center of the insert itself, any chips cut from the workpiece will be caused to pull up and away from the workpiece and carried up the flute by the cutting edge 39.

Figure 3:
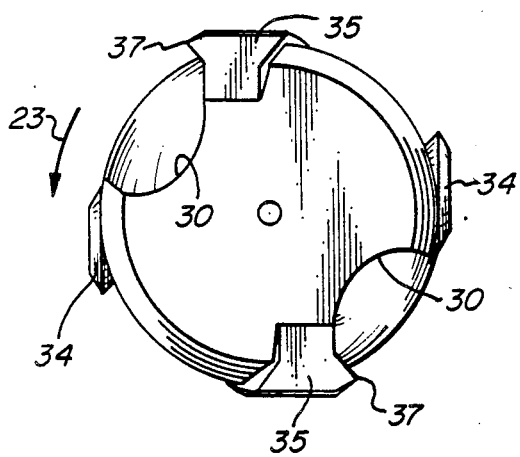
FIG. 3 is a bottom plan view of the end mill cutter of FIG. 2.

The opposed sides 41 of the insert 35 fall away from the cutting edge 39 at an angle of approximately 30° to the vertical so that the sides can be firmly seated in a 60° conical seat formed in the cutter body 27 as illustrated readily in FIGS. 3 and 4. The sides 42 contiguous to and between the cutting edges 39 are substantially flat or planar.

Figure 9:
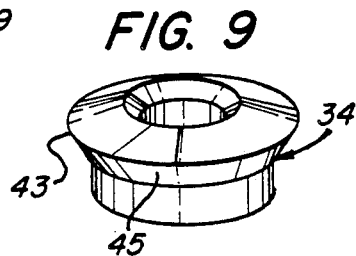
FIG. 9 is a perspective view of a second type of insert used with the cutter of FIG. 1.
Figure 10:
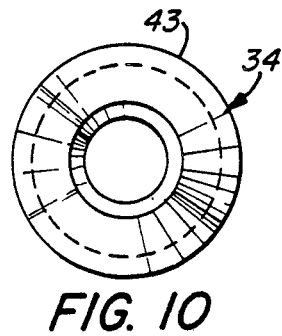
FIG. 10 is a top plan view of the insert of FIG. 9.
Figure 11:
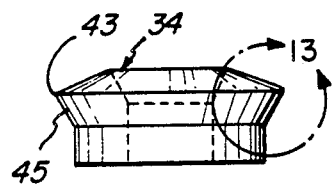
FIG. 11 is a front view in elevation of the insert of FIG. 10.

Each of the inserts 34 arranged in series in adjacent slots 30 and above the rhomboid insert 35 is illustrated in detail in FIGS. 9 to 11, inclusive, and includes a circular cutting edge 43. Cutting edge 43 falls away to an annular side wall 45 which is tapered at approximately 30° with respect to the longitudinal axis of the insert so that the insert can also be seated in a 60° conical seat as shown in FIG. 5. This assures rigidity for the insert in its mounting and firm contact with the cutting edge with the workpiece.

Figure 13:
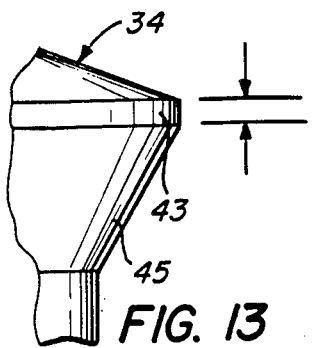
FIG. 13 is an enlarged view of an alternate form of the portion of the insert of FIG. 11 indicated by circle 13—13 of FIG. 11.

As shown on FIG. 13, the cutting edge 43 of each circular insert 34 (and if desired, the cutting edges 39 of each insert 35) can be provided with a negative land or flat, as an option. This will serve to increase the strength of the cutting edge 43, although the benefits obtained from positive radial rake cutting will be forfeited.

It should also be understood that the tool 20 can be manufactured with different diameters; particularly, the geometry lends itself to the manufacture of small size diameter on the order of ½ to 1 inch.

An end mill 20, constructed as shown in FIGS. 1 and 2, with a 1.144 inch cutting diameter and provided with two rhomboid inserts 35 and eighteen circular or special round inserts 34 arranged adjacent four helical slots or flutes 30, was tested to determine chip expulsion and wear. The rhomboid inserts 35 were formed from Carboloy 370 tungsten carbide, while the circular or round inserts were formed from Valeron VC55 tungsten carbide. The tests conducted and the results thereof are described in more detail below:

| Work material: | SAE 1045 hra, 200 BHN |
|---|---|
| Mode: | Climb mill dry, Channel dry with air blast |
| Machine: | 50 hb Cincinnati vertical mill |
| Test description: | Three tests were conducted; Test No. 1, peripheral milling; No. 2, shoulder milling; Test No. 3, Channel milling |

TEST NO. 1: 352 sfm(surface feet/min); 1.5 inch doc(depth of cut); 8 inch loc(length of cut); (all cuts).

| Cut No. | IPM(inch/min) | fpt(ft/tooth) | woc(width of cut) |
|---|---|---|---|
| 1 | 9 | .0038 | .100 |
| 2 | 9 | .0038 | .200 |
| 3 | 9 | .0038 | .300 |
| 4 | 11 | .0047 | .100 |
| 5 | 11 | .0047 | .200 |
| 6 | 11 | .0047 | .300 |
| 7 | 13 | .0055 | .100 |
| 8 | 13 | .0055 | .200 |
| 9 | 13 | .0055 | .300 |
| 10 | 15¼ | .0065 | .100 |
| 11 | 15¼ | .0065 | .200 |
| 12 | 15¼ | .0065 | .300 |
| 13 | 7½ | .0032 | .500 |
| 14 | 9 | .0038 | .500 |
| 15 | 11 | .0047 | .500 |

TEST NO. 2: 352 sfm, .250 inch doc, .0032 fpt, 8 inch loc(all cuts)

| Cut No. | WOC |
|---|---|
| 16 | .050 |
| 17 | .100 |
| 18 | .150 |
| 19 | .200 |
| 20 | .250 |
| 21 | .300 |
| 22 | .500 |
| 23 | .500 |

TEST NO. 3: 352 sfm, 1.144 woc, .0032 fpt, 4" loc(all cuts)

| Cut No. | DOC |
|---|---|
| 24 | .050 |
| 25 | .100 |
| 26 | .200 |
| 27 | .500 |
| 28 | .750 |
| 29 | 1.000 air blast |
| 30 | 1.250 air blast |
| 31 | 1.500 air blast |

Results

All passes were made with one cutting edge of each insert (no indexing). A total of 31 cuts were taken removing 100.06 cubic inches.

The cutter was exposed to 216 linear inches (18 ft.) and 63.19 minutes of traverse time.

The end rhomboid inserts had a max. flank wear of 0.012", and the round inserts exhibited a maximum of 0.005" flank wear. None of the inserts revealed any chipping. No crater or thermal cracking could be discerned.

Chip expulsion was excellent for all tests, as chips did not adhere to cutting edges at any time.

What is claimed is as follows:

1. An indexable insert for an end mill cutting tool, comprising:
   a curved rhomboidal rotatable block of cutting material having alternately opposed substantially planar surfaces and curved on-edge cutting edges disposed about a center, said cutting edges formed from an intersection of opposed frusto-conical surfaces,
   said curved cutting edges characterized by radii of curvature displaced from said block center substantially along a block diagonal.

2. The insert of claim 1 wherein the center of the radius of each of the curved edges of said insert are substantially colinear with said block center.

3. The insert of claim 1 including a threaded aperture extending through said block of material.

4. The insert of claim 3 wherein said curved cutting edges are formed with a land area.

5. The insert of claim 1 wherein said planar surfaces are laterally disposed one from the other.

6. A helical end mill cutter, comprising:
   a rotary body having an outer periphery, and slots formed in its outer periphery alternately extending fully to the distal end of said body, each of said slots receiving in staggered sequence therealong rotatable cutting inserts circular in plan, providing a plurality of indexable cutting edges in said slot, each insert tiltable about the longitudinal axis of said cutter body enabling a cutting edge thereof to be disposed at a positive axial and positive radial rake, said circular insert cutting edges formed from opposed frusto-conical surfaces; and
   a curved rhomboidal rotatable on-edge cutting insert positioned to said fully extending slots' distal end, said curved rhomboidal insert having alternately opposed substantially planar and curved cutting edges disposed about a center, said cutting edges formed from opposed frusto-conical surfaces, said cutting edges characterized by radii of curvature displaced from said center, colinear therewith substantially along an insert diagonal, said insert further positioned on said body having a portion of one of said curved cutting edges being disposed in said fully extending slot, with a cutting edge corner extending below the bottom plane of said cutter body, said curved rhomboidal insert further disposed at a positive axial rake and positive radial rake on said cutter body such that said radial rake proceeds from neutral to positive along said cutting edge upon entering a workpiece.

7. The curved rhomboidal insert of claim 6, wherein planar surfaces are laterally disposed one from the other.

8. The helical end mill of claim 6 wherein said curved rhomboidal insert corner extends below said cutter body bottom plane by approximately three degrees.

9. The inserts of claim 6 including a threaded aperture extending through said block.

* * * * *